(12) United States Patent
Capello (10) Patent No.: US 10,743,466 B2
(45) Date of Patent: Aug. 18, 2020

(54) HARVESTING HEADER FOR A GRAIN HARVESTING MACHINE

(71) Applicant: CAPELLO S.R.L., Cuneo (IT)

(72) Inventor: Andrea Capello, Cuneo (IT)

(73) Assignee: CAPELLO S.R.L., Cuneo (IT)

( * ) Notice: Subject to any disclaimer, the term of this patent is extended or adjusted under 35 U.S.C. 154(b) by 0 days.

(21) Appl. No.: 16/473,306

(22) PCT Filed: Dec. 27, 2017

(86) PCT No.: PCT/IB2017/058435
§ 371 (c)(1),
(2) Date: Jun. 25, 2019

(87) PCT Pub. No.: WO2018/122744
PCT Pub. Date: Jul. 5, 2018

(65) Prior Publication Data
US 2019/0335663 A1 Nov. 7, 2019

(30) Foreign Application Priority Data

Dec. 27, 2016 (IT) .......................... 102016000131283

(51) Int. Cl.
*A01D 41/14* (2006.01)
*A01B 73/04* (2006.01)
(Continued)

(52) U.S. Cl.
CPC ......... *A01D 41/144* (2013.01); *A01D 41/142* (2013.01); *A01D 41/145* (2013.01);
(Continued)

(58) Field of Classification Search
CPC .... A01D 41/14; A01D 41/144; A01D 41/142; A01D 41/145; A01D 45/30; A01D 34/01;
(Continued)

(56) References Cited

U.S. PATENT DOCUMENTS 3,813,859 A * 6/1974 Fuller .................... A01D 34/04
56/260
4,414,794 A 11/1983 Riedinger
(Continued)

FOREIGN PATENT DOCUMENTS

EP 0131853 A1 1/1985
EP 0789990 A1 8/1997
(Continued)

*Primary Examiner* — Robert E Pezzuto
*Assistant Examiner* — Adam J Behrens
(74) *Attorney, Agent, or Firm* — Howson & Howson LLP (57) ABSTRACT

A harvesting header for a combine harvester comprises a central header section and two lateral header sections hinged to and arranged to rotate relative to the central section for assuming a working configuration, in which the three header sections are mutually horizontally aligned, and a transport configuration, in which the lateral header sections overlap the central section. The header sections are provided with a support frame and a cutting bar associated with the support frame by a hydraulic suspension and comprising a blade having substantially trapezoid-shaped knives capable of to-and-fro movement by a motor-driven control member. The header sections also include a pick-up reel supported on the support frame by means of swivel arms, a transport belt conveyor arranged downstream of the cutting bar and configured to feed the material cut by the cutting bar downstream of the harvesting header toward a rear part of the harvesting header.

12 Claims, 6 Drawing Sheets

(51) Int. Cl.
*A01D 45/30* (2006.01)
*A01D 57/12* (2006.01)
*A01D 57/20* (2006.01)

(52) U.S. Cl.
CPC .............. *A01D 45/30* (2013.01); *A01D 57/12* (2013.01); *A01D 57/20* (2013.01)

(58) Field of Classification Search
CPC ........ A01D 34/04; A01D 57/12; A01D 57/20; A01D 57/02; A01B 73/00–067
See application file for complete search history.

(56) References Cited

U.S. PATENT DOCUMENTS

| | | | | |
|---|---|---|---|---|
| 5,724,798 A | * | 3/1998 | Stefl | A01D 41/144 172/311 |
| 7,650,736 B1 | | 1/2010 | Salley et al. | |
| 7,992,372 B1 | * | 8/2011 | Coers | A01D 41/14 56/153 |
| 8,272,198 B1 | * | 9/2012 | Allochis | A01D 41/14 56/153 |
| 8,955,297 B2 | | 2/2015 | Capello et al. | |
| 9,402,343 B1 | * | 8/2016 | Allochis | A01D 34/283 |
| 10,136,580 B2 | | 11/2018 | Capello | |
| 10,292,331 B2 | * | 5/2019 | Lauwers | A01D 61/002 |
| 2007/0204584 A1 | * | 9/2007 | Coers | A01D 41/14 56/15.8 |
| 2014/0075912 A1 | * | 3/2014 | Fuechtling | A01D 43/06 56/181 |
| 2014/0378236 A1 | * | 12/2014 | Ritter | F16C 3/02 464/162 |
| 2015/0216121 A1 | * | 8/2015 | Roberge | A01D 41/144 56/14.7 |
| 2018/0035598 A1 | * | 2/2018 | Wenger | A01B 73/065 |
| 2018/0110176 A1 | * | 4/2018 | Ysebaert | A01B 73/044 |

FOREIGN PATENT DOCUMENTS

| | | | | |
|---|---|---|---|---|
| EP | 0789990 B1 | * | 4/2001 | ............ A01D 34/30 |
| EP | 2145526 A2 | | 1/2010 | |
| HU | 204644 B | * | 2/1992 | ........... A01D 41/144 |

* cited by examiner

HARVESTING HEADER FOR A GRAIN HARVESTING MACHINE

TECHNICAL FIELD

The invention relates to a harvesting header for a grain harvesting machine. More precisely, the invention concerns a harvesting header with a draper conveyor belt for grain cutting and harvesting. The header can be associated with a grain harvesting machine such as, for instance, a combine harvester.

PRIOR ART

As known, combine harvesters are self-propelled machines equipped with a header performing grain reaping, essentially consisting in cutting the plants, and with a threshing assembly performing threshing, essentially consisting in separating the grains of wheat and other cereals from straw and chaff. A prior art combine harvester is disclosed for instance in U.S. Pat. No. 4,414,794(A).

A prior art combine harvester such as the harvester in accordance with the above example is equipped with a harvesting header cutting and harvesting the vegetable material and feeding it to a collecting mouth of the combine harvester, usually associated with a separating apparatus separating grains from chaff. In prior art harvesters, the harvesting header is located in the front part of the harvester, i.e. adjacent to the front axle thereof, along a transverse direction with respect to the direction of rectilinear advance of the harvester.

Generally, the harvesting header transversely extends over a considerable length, which can even exceed 10 m and determines therefore a bulk that is hardly compatible with the normal public roads for the access to the agricultural fields to be worked. For that reason, harvesting headers for grain harvesting machines equipped with foldable wings have been developed in the past. Such headers can substantially take two configurations, namely a first configuration in which the wings are aligned with each other and with the central header section associated with the combine harvester, and a second configuration in which the wings are folded for instance by 90° or even more, in order to reduce the longitudinal size of the header and consequently the transverse size of the harvester. The first configuration is taken when the harvester is in working condition and performs grain harvesting. The second configuration is taken for transfers and garaging, or generally in all conditions in which it is preferable to reduce the transverse size of the machine. An example of prior art header with foldable wings is disclosed in EP131853(A).

A harvesting header for combine harvesters mainly includes a support frame with which a cutting bar performing plant cutting is associated, a device for conveying and feeding the cut material towards the collecting mouth of the combine harvester, and a pick-up reel for folding the crop towards the cutting bar and pulling down the parts cut by the cutting bar onto the conveying device. The frame has moreover associated therewith the control devices, generally of hydraulic type, which move the blade of the cutting bar and the conveying device and make the pick-up reel rotate. In prior art harvesting headers, the cutting bar, the conveying device and the pick-up reel generally extend over the whole length of the harvesting header and therefore determine the transverse size of the machine with which the header is associated.

The design phase of a foldable harvesting header is therefore quite complex, due to the number of mechanical parts involved and to the fact that some of these parts are motor driven and must be operating when the header is in its working condition. Maintaining the alignments between the stationary parts, but especially between the parts that can be moved during header operation, is a problem that has been hitherto difficult to solve. In an attempt to solve that problem, technologically complex solutions, or solutions requiring human interventions when the header is to be folded or extended in order to be configured in the rest or the working condition, respectively, have been often adopted until now. Therefore, in the field, the need is felt to have at disposal harvesting headers for grain harvesting machines which have a simple and rational construction, can be easily folded in order to reduce the longitudinal size thereof, and substantially dispense with human intervention in the various steps of header folding or extension.

Thus, it is a first object of the invention to provide a harvesting header for a grain harvesting machine which overcomes the drawbacks of the prior art and which meets the above need. It is another object of the invention to provide a harvesting header for a grain harvesting machine which is particularly flexible and versatile. It is a further object of the invention to provide a harvesting header which is more reliable and demands less maintenance than the headers presently existing on the market. It is a further object of the invention to provide a header of the above kind, which has lower power absorption and therefore is cheaper to use. It is yet another object of the invention to provide a harvesting header which can be mounted on a multiplicity of grain harvesting machines, in particular combine harvesters, of different manufactures or of different powers and sizes. It is yet a further, but not the last object of the invention to provide a harvesting header which can be constructed at limited costs and therefore is suitable for large scale industrial production.

The above and other objects are achieved by means of the harvesting header for a grain harvesting machine as claimed in the appended claims.

DESCRIPTION OF THE INVENTION

The invention relates to a belt harvesting header for a grain harvesting machine. The header mainly comprises a central header section and a pair of lateral header sections or wings. The lateral sections are hinged to the opposite sides of the central section and are arranged to rotate relative to the central section about the respective hinge axis. The header can thus assume a working configuration, in which the three header sections are mutually horizontally aligned, and a rest or transport configuration, in which the lateral sections overlap the central section. The rotation of the lateral sections is preferably of about 180°.

Each header section is provided with a corresponding support frame. The support frame of the central header section can be steadily associated with a grain harvesting machine by conventional means. The support frames of the lateral sections are hinged to the support frame of the central section. The support frame of the central section and the support frame of the adjacent lateral section are preferably hinged to each other by means of a pair of hinges. A first hinge is a rear hinge and a second hinge is a front hinge with reference to the advance direction of the header when the latter is associated with a combine harvester. Each hinge comprises a pair of plates and each plate is associated with a corresponding support frame of the header sections. Preferably, the hinges of each pair of hinges rotate about the same axis. Furthermore, each header section mainly includes a cutting bar, a pick-up reel and a conveyor for the cut material.

The cutting bar is motor-driven and substantially horizontal, and is located in the front part of the harvesting header when the latter is in its working configuration. According to the invention, the cutting bar is associated with the corresponding support frame by means of a hydraulic suspension. The cutting bar further comprises a blade having a plurality of substantially trapezoid-shaped knives and is capable of carrying out a to-and-fro movement thanks to a motor-driven control member.

Also the pick-up reel is motor-driven, and it is arranged substantially horizontally above the cutting bar and is supported on the frame by means of a hydraulic suspension system equipped with swivel arms and hydraulic cylinders. Preferably, according to the invention, the hydraulic suspension system supporting the pick-up reel is separate and independent from the suspension system supporting the cutting bar.

The conveyor is a transport belt conveyor arranged downstream of the cutting bar. The transport belts are equipped with drapers rotatable on rollers, which can be idle rollers and motor-driven pulling rollers. The transport belts of the lateral header sections are configured to feed the material cut by the cutting bar towards the central header section, i.e. in a direction substantially perpendicular to the advance direction of the header during grain cutting. The transport belt of the central header section comprises a central belt portion and a pair of lateral belt portions, wherein the lateral belt portions are configured to feed the material coming from the adjacent lateral header sections and from the cutting bar of the central header section towards the central belt portion. The central belt portion is configured to cooperate with a feeding roller provided in the central header section for feeding the material downstream of the header towards the rear part of the header.

Preferably, the transport belt system is equipped with five belt portions, i.e. with five drapers rotatable on corresponding rollers. Four transport belt portions are configured and oriented so as to move the corresponding drapers in a direction perpendicular to the advance direction of the header, and one section is configured so as to move the corresponding draper in a direction parallel to the advance direction of the header. More precisely, in a preferred embodiment of the invention, each lateral header section comprises a transport belt equipped with a corresponding rotatable draper, and the central section comprises three transport belts each equipped with a corresponding rotatable draper.

The transport belts of the lateral sections are configured and oriented so as to convey the material depositing on the upper surfaces of the belt drapers, i.e. substantially the material cut by the corresponding cutting bar section during header operation, towards the central section. More particularly, when the transport belts of the lateral sections comprise each a single draper, the rotatable draper of the transport belt of each lateral section rotates about rollers having axes parallel to the advance direction of the header. Moreover, the rollers are moved so as to pull the draper in such a manner that the upper draper surface advances from the outside of the header towards the inside, i.e. so as to feed the material present on the draper towards the central header section to which the lateral header sections are hinged. Thus, the respective upper surfaces of the belt drapers of the lateral header sections advance in a mutually convergent direction.

The transport belt of the central section is configured and oriented so as to convey the material depositing on the upper surface of the belt draper, i.e. substantially the material cut by the cutting bar during header operation, towards the central section and the rear part of the header, i.e. towards the collecting mouth of the combine harvester with which the header is associated. Preferably, the transport belt of the central section comprises three drapers, namely a pair of lateral drapers and a central draper. The lateral drapers rotate about rollers having axes parallel to the advance direction of the header. The central draper rotates about rollers having axes perpendicular to the advance direction of the header. The drapers of the lateral belts convey towards the central draper the material depositing on them, substantially corresponding to the material coming from the drapers of the conveyor belts of the adjacent lateral header sections and the material resulting from cutting with the cutting bar of the central section. Thus, the respective upper surfaces of the lateral drapers of the central header section advance in a mutually convergent direction.

The central draper of the transport belt of the central section cooperates with a rotatable feeding roller or auger having axis of rotation perpendicular to the advance direction of the header. The cooperation between the central draper of the transport belt of the central section and the feeding roller or auger causes feeding of the cut material towards the collecting mouth of the combine harvester with which the header is associated. The rotatable roller or auger preferably has a plurality of retractable fingers configured so as to define a helical profile.

The provision in the central header section of a transport belt having three drapers instead of only one as in the lateral sections is mainly due to the fact that the cut material arriving at the central section is to be fed to the combine harvester in order to be collected and processed, and also to the fact that the length of each of the lateral header sections is preferably far shorter than that of the central section and, even more preferably, ranges from about one half to about one third of the length of the central section. In this manner it is possible to fold both lateral sections so that they overlap the central section when the header is in the rest or transport configuration, whereby a longitudinal size substantially corresponding to the size of the only central section is obtained.

The axes of all rollers of the drapers of the transport belt system are substantially mutually coplanar when the header is working. The axis of the feeding roller or auger is preferably located at a higher level than the plane of the axes of the rollers of the transport belt system when the harvesting header is in the working configuration, and moreover it rotates in a plane parallel to the plane on which the axes of the draper shafts are located.

Preferably, the transport belts of both lateral sections have an advance speed greater than the advance speed of the lateral belts provided in the central section and intended to receive the material coming from the belts of the adjacent lateral sections.

The flexible cutting system includes a cutting bar suspended on arms of a rigid or swiveling suspension system. Preferably moreover the swiveling suspension system is a hydraulic system, equipped with hydraulic cylinders and accumulators and preferably assisted by resilient members, e.g. extension springs. Optionally, the arms of the suspension system are stiffened. Preferably moreover the transport belt system is associated with the same suspension system as the cutting bar. The arms of the suspension system support, besides the cutting bar, also the transport belts located behind and at a higher level than the cutting bar when the machine is in its working configuration.

Advantages of the invention come for instance from the adoption of a flexible cutting system, i.e. a cutting bar having a plurality of knives and associated with a suspension system having a plurality of arms, which enables the blade to adapt itself to the ground variations.

An advantage of the invention comes also from the reduced longitudinal size when the header is folded, i.e. when the lateral sections are folded onto and overlap the central section. Actually, the grain harvesting machine equipped with the header according to the invention can be easily transferred from a working area to another, thanks to the reduced transverse size. This advantage is attained also thanks to the hinge system of the lateral header sections to the central section. Such a hinge system actually allows reducing the length of the folded header substantially to the size of the central portion only.

Another example of the advantages of the invention comes from the adoption of a transport belt system for feeding the cut material towards the rear part of the header and from here towards the grain harvesting machine with which the header is associated. Actually, the transport belt system comprising a plurality of suitably configured and spatially oriented belts is advantageously suitable for the construction of a folding header, i.e. a header having foldable lateral sections. The header according to the invention has lateral sections that can advantageously be folded about a hinge axis arranged so as to enable a rotation of the lateral sections by about 180°. The rotation of the lateral sections by about 180° allows advantageously obtaining a header which is particularly compact and has a reduced vertical extension when folded. The compactness and the reduced vertical extension, i.e. the reduced extension in height, of the folded header are a considerable advantage for the visibility by the driver of the grain harvesting machine equipped with the header. The driving safety and the maneuverability of the grain harvesting machine are consequently improved.

Another advantage of the invention comes from the adoption of a flexible cutting system, i.e. a cutting bar having a plurality of knives and associated with a suspension system allowing the blade to adapt itself to the ground variations. The possibility of adaptation to the ground variations makes the header versatile and suitable for several applications on even non-optimal surfaces and suitable to cut and harvest a wide range of crops.

Another advantage of the invention comes from the adoption of a hydraulic suspension system having swivel supporting arms, with which system both the flexible cutting system and the transport belt system are associated. The provision of a single suspension system with which both the cutting system and the transport belt system are associated results in a substantially simultaneous adaptation of both systems to the variations of the ground on which the header is working. In other words, at each oscillation of the swivel arms, a consequent attitude variation of the cutting system and a substantially simultaneous attitude variation of the transport belt system are obtained, whereby the vegetable material cut by the cutting system substantially always meets the transport belt system in the best relative position and the cut material is prevented from being dispersed or arranged in incorrect manner for the subsequent feeding to the combine harvester.

A further advantage of the invention comes from the adoption of a system for folding the lateral header sections about hinges located in a rear position, between the frames of the header sections. The rear arrangement of the hinges advantageously enables the smooth rotation, without jamming, of the lateral sections relative to the central section, besides the mutual rotation of the respective frames, the transport belt system and the reel. The smooth rotation, without jamming, is ensured in particular by the substantial lack of members connecting the parts in relative movement during rotation. Actually, according to the invention, such parts are mutually disconnected when the header passes from the extended working configuration to the folded rest configuration.

Another advantage of the invention comes from the adoption of a folding system for the reel having a suitable corresponding hinge. The adoption of a hinge for the reel, permanently connecting the adjacent reel sections, advantageously ensures that each reel section remains connected to the adjacent section during folding of the lateral header sections, thereby maintaining an optimum alignment among the parts, indispensable for motion transmission to the different sections of the whole reel. Preferably, but not exclusively, such a hinge dedicated to the reel has a hinge axis coinciding with the hinge axis of the rear hinge rotatably connecting the frames of the adjacent header sections.

A further, but not the last advantage of the invention comes from the fact that the header integrates at the same time a structure equipped with foldable wings, i.e. with lateral sections folding over the central section, a draper belt feeding system, i.e. a system provided with flexible drapers, and a flexible cutting system, i.e. a system arranged to adapt itself to the variations of the plane of the ground on which the grain harvesting machine equipped with the header is working. Moreover, the different speeds of the transport belts of the transport belt system, in which the drapers of the belts of the lateral sections rotate faster than the adjacent belts of the central section, affords the advantage of conveying the material substantially with a "launching" effect from the lateral sections towards the central section. Such a "launching" effect enables the material fed by the belts of the lateral sections to pass the gap unavoidably existing between the lateral header sections and the central section. Actually such a gap is due to the discontinuity, between a lateral section and the adjacent central section, of the surface on which the material advances, and it is necessary in order to enable folding of the lateral sections. The adoption of a belt feeding system further allows limiting the vertical extension of the header when it is folded with the lateral sections or wings overlapping the stationary central section connected to the combine harvester.

BRIEF DESCRIPTION OF THE FIGURES

Some preferred embodiments of the invention will be described by way of non-limiting example with reference to the accompanying Figures, in which.

In all Figures, the same reference numerals have been used to denote equal or functionally equivalent components.

DESCRIPTION OF SOME PREFERRED EMBODIMENTS

Figure 1:
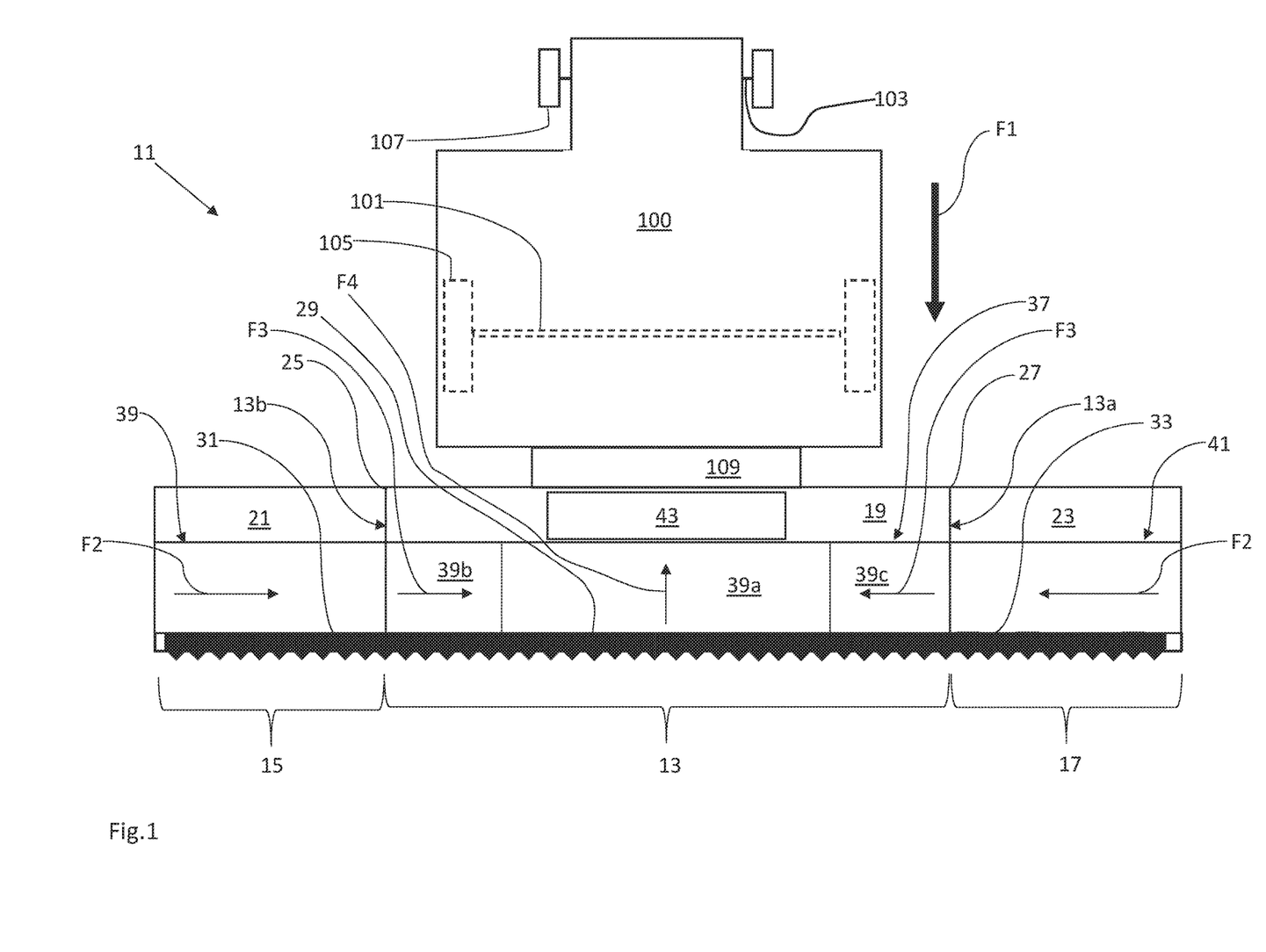
FIG. 1 is a schematic plan view of the header according to a preferred embodiment of the invention.

Referring to FIG. 1, there is schematically shown harvesting header 11 for grain harvesting machines according to a preferred embodiment of the invention.

Header 11 comprises a central header section 13 and a pair of lateral header sections 15, 17. Lateral sections 15, 17 are hinged to opposite sides 13a, 13b of central section 13. Each header section 13, 15, 17 has a respective support frame 19, 21, 23. Support frame 19 of central header section 13 can be steadily associated with a grain harvesting machine 100. In the embodiment illustrated, machine 100 has a front axle 101, a rear axle 103 and corresponding wheel pairs 105, 107. In the Figure, arrow F1 denotes the advance direction of machine 100 when it performs reaping by means of header 11.

Support frames 21, 23 of lateral header sections 15, 17 are hinged to sides 13a, 13b of central section 13 by means of respective hinge pairs 25, 27.

Each header section 13, 15, 17 further includes a respective motor-driven cutting bar 29, 31, 33 arranged in front of cutting header 11. Cutting bar 29, 31, 33 is substantially rectilinear, horizontal and parallel to ground when machine 100 is working in the field. Cutting bar 29, 31, 33 is associated with the corresponding support frame 19, 21, 23 by means of a hydraulic suspension system.

Each header section 13, 15, 17 further includes a transport belt conveyor 37, 39, 41 arranged downstream of cutting bar 29, 31, 33. Transport belts 39, 41 of lateral header sections 15, 17 are configured to feed the material cut by cutting bar 31, 33 towards central header section 13, i.e. in a direction (arrows F2) substantially perpendicular to the advance direction of header 11 (arrow F1) when the latter is cutting grain. Transport belt 37 of central header section 13 comprises a central belt portion 39a and a pair of lateral belt portions 39b, 39c. Lateral belt portions 39b, 39c are configured to feed the cut material, coming from adjacent lateral header sections 15, 17 and from cutting bar 29 of central header section 13, towards central belt portion 39a (arrows F3). Central belt portion 39a is configured to cooperate with a feeding roller 43 provided in central header section 13 for feeding the material downstream of header 11, towards the rear part of the header, at collecting mouth 109 of grain harvesting machine 100 with which header 11 is associated (arrow F4).

Figure 2:
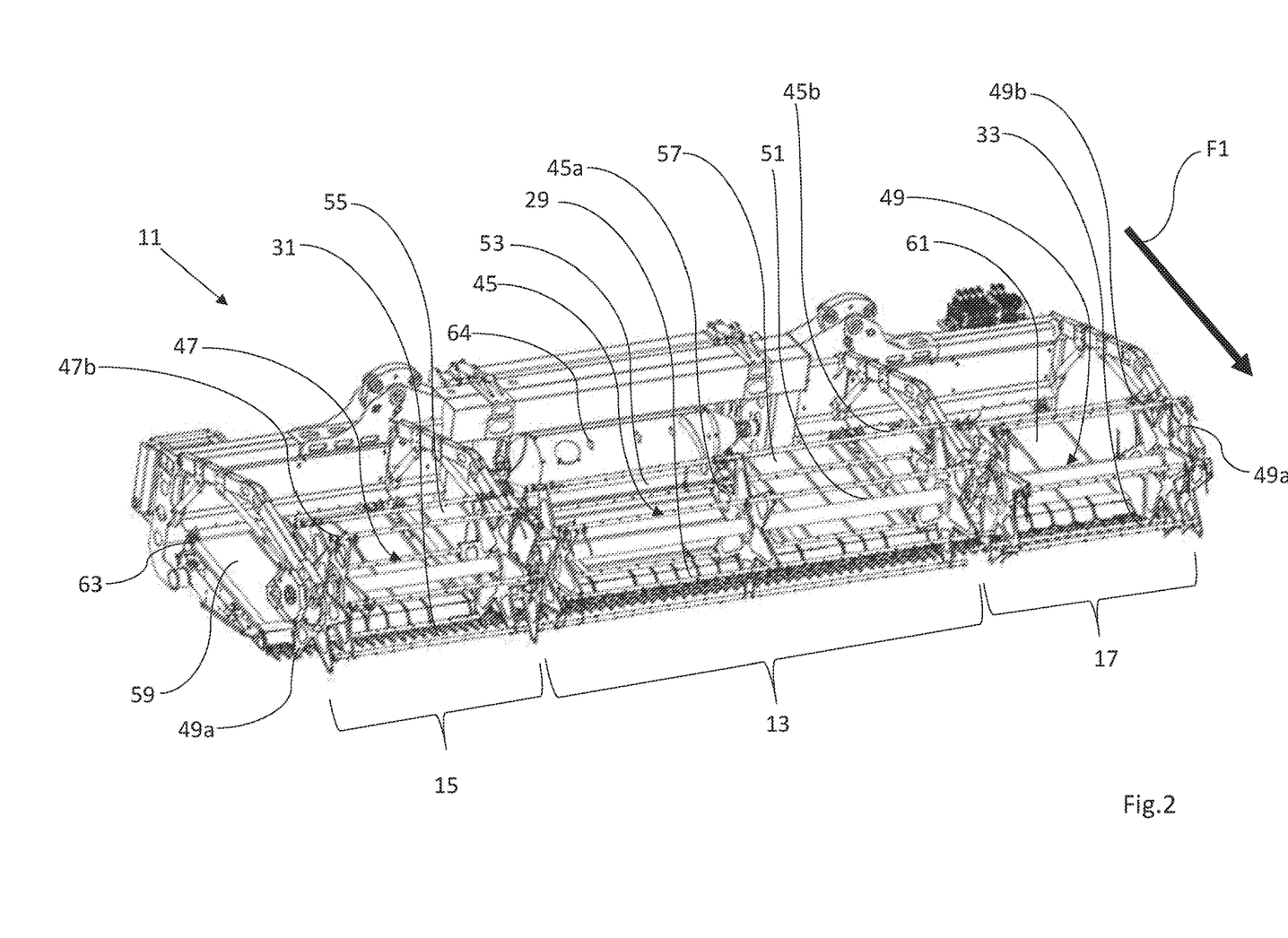
FIG. 2 is a perspective view of the header according to a preferred embodiment of the invention, in operative or working configuration.

Referring to FIG. 2, there is shown harvesting header 11 in operative or working configuration, i.e. the configuration taken when header 11 is associated with a combine harvester and cuts and harvests grain. In such a configuration, lateral header sections 15, 17 are aligned with central section 13. Moreover, always referring to such a configuration, sections 37, 39, 41 of the transport belt conveyor and sections 29, 31, 33 of the cutting bar will lie substantially in the same plane.

Each header section 13, 15, 17 further includes a respective pick-up reel 45, 47, 49, arranged substantially above cutting bar 29, 31, 33 when header 11 is in working configuration and is cutting grain in the field. Pick-up reel 45, 47, 49 has a rotatable shaft 51 extending parallel to cutting bar 29, 31, 33. Reel 45, 47, 49 is applied to header 11 in order to fold the crop towards cutting bar 29, 31, 33 and pull down the cut plants onto transport belt conveyor 37, 39, 41. Reel 45, 47, 49 is formed by a prismatic rotary structure provided with vanes 45a, 47a, 49a mutually connected by tie rods 45b, 47b, 49b. Preferably, reel 45, 47, 49 is both vertically and horizontally adjustable depending on the harvest condition, and it is hydraulically driven so that its rotation speed is proportional to the advance speed of header 11.

The three sections 37, 39, 41 of the transport belt conveyor are in the whole equipped with five drapers 53, 55, 57, 59, 61 rotatable on corresponding rollers 63. More precisely, in the embodiment illustrated, each lateral header section 15, 17 includes a corresponding transport belt 39, 41 equipped with a corresponding rotatable draper 59, 61, respectively. Central header section 13 comprises a corresponding transport belt 37, having a central portion 39a and two lateral portions 39b, 39c, each equipped with a corresponding rotatable draper 53, 55, 57, respectively. The four drapers 55, 57, 59, 61 are moved in a direction perpendicular to the advance direction of header 11. Draper 53 of central transport belt portion 39a is moved in a direction parallel to the advance direction of header 11.

Rotatable drapers 59, 61 of transport belts 39, 41 of lateral sections 15, 17 rotate on rollers 63 having axes parallel to the advance direction of the header (arrow F1). Moreover, rollers 63 are moved so as to pull drapers 59, 61 in such a manner that the upper draper surfaces advance from the outside of header 11 towards the centre thereof, i.e. so as to feed the material present on drapers 59, 61 towards central section 13 of header 11 to which lateral sections 15, 17 are hinged.

Transport belt conveyor 37 of central section 13 is configured and oriented so as to convey the material depositing on the upper surfaces of drapers 53, 55, 57 of belt conveyor 37, i.e. essentially the material cut by cutting bar 29, 31, 33 during operation of header 11, towards central section 13 and the rear part of header 11, i.e. towards collecting mouth 109 of combine harvester 100 with which header 11 is associated. The three drapers 53, 55, 57 of transport belt conveyor 37 of central section 13 comprise a pair of lateral drapers 55, 57 and a central draper 53. Lateral drapers 55, 57 rotate on rollers 55 having axes parallel to the advance direction of the header (arrow F1). Central draper 53 rotates about rollers 55 having axes perpendicular to the advance direction of the header (arrow F1). Thus, lateral drapers 55, 57 convey towards central draper 53 the material depositing thereon, substantially corresponding to the material coming from drapers 59, 61 of transport belts 39, 41 of adjacent lateral sections 15, 17 and to the material produced by the cutting with cutting bar 29 of central header section 13. Central draper 53 feeds towards the rear part of header 11 the material depositing thereon, substantially corresponding to the material coming from lateral drapers 55, 57 of central section 13 and to the material produced by the cutting with cutting bar 29 of central section 13.

Central draper 53 of transport belt 37 of central section 13 cooperates moreover with a feeding roller 43 having axis of rotation perpendicular to the advance direction of header 11 (arrow F1). In the embodiment illustrated, roller 43 is provided with a plurality of retractable fingers 64 distributed according to a helical profile and substantially defines a corresponding rotatable auger. The cooperation between central draper 53 of transport belt 37 of central section 13 and feeding roller 43 causes feeding of the cut material towards collecting mouth 109 of combine harvester 100 with which header 11 is associated.

Figure 3:
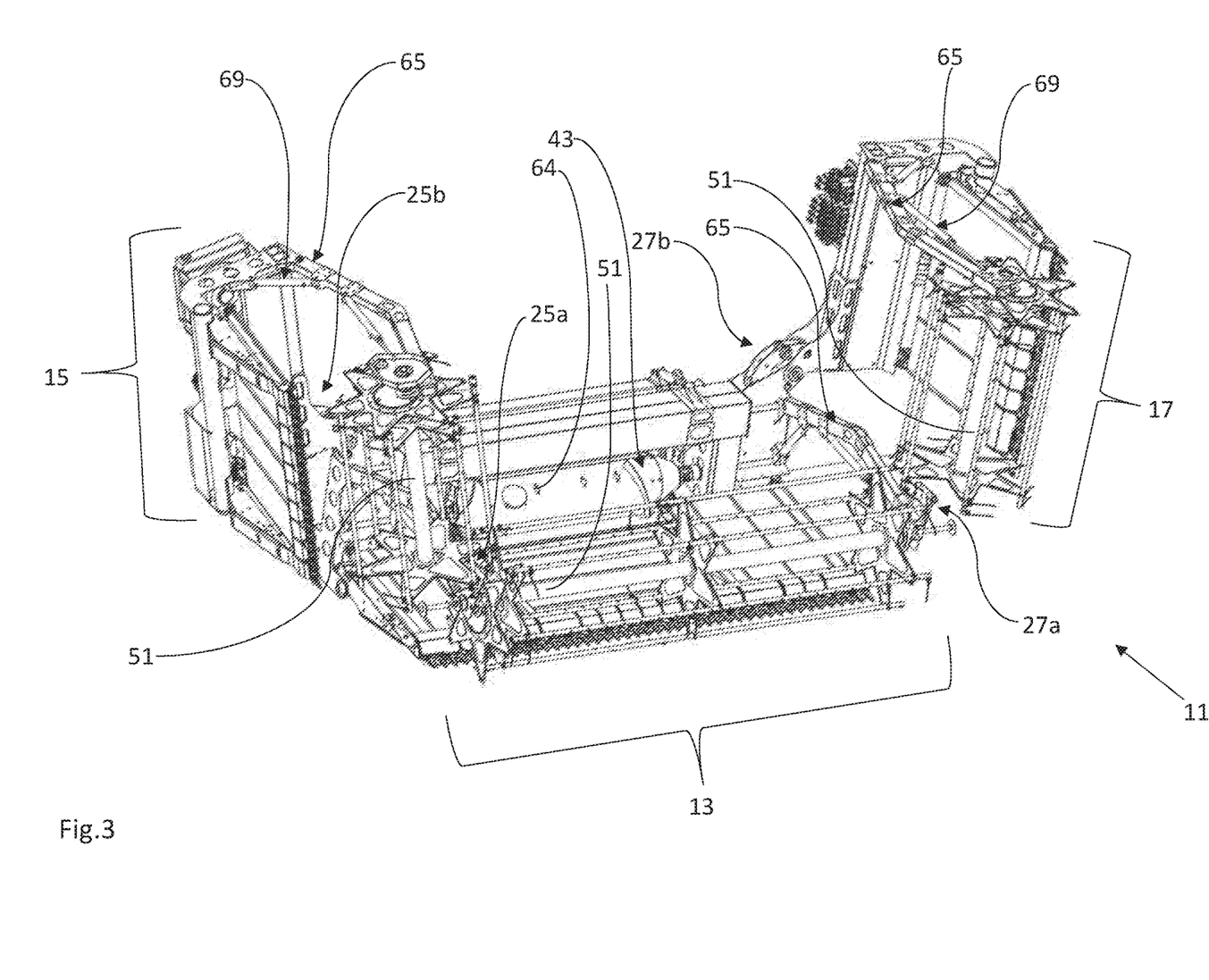
FIG. 3 is a perspective view of the header shown in FIG. 2, in partially folded configuration.

Referring to FIG. 3, header 11 is shown with lateral header sections 15, 17 partially folded about hinges 25, 27. Each of said hinge pairs 25, 27, in the preferred embodiment illustrated, comprises a front hinge 25a, 27a and a rear hinge 25b, 27b. Front hinges 25a, 27a connect together the two adjacent arms 65 supporting rotatable shaft 51 of reel 45, 47, 49. Arms 65 are hinged at their rear end to the corresponding support frame 19, 21, 23 at hinge pivots 67. Moreover, arms 65 cooperate with hydraulic cylinders 69 arranged to maintain the desired suspended attitude of reel 45, 47, 49.

Figures 3A, 3B:
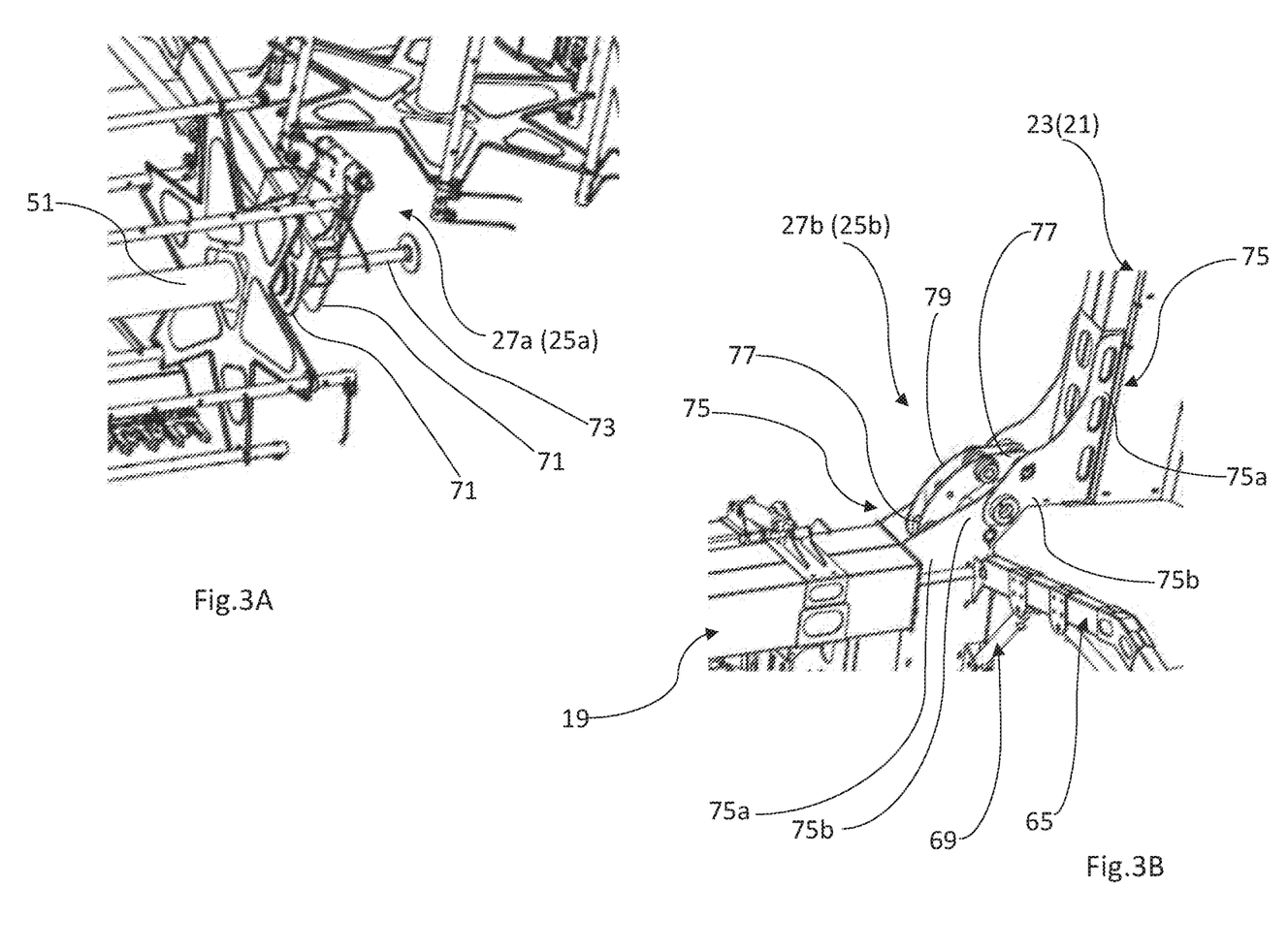
FIGS. 3A and 3B are enlarged views of corresponding details of FIG. 2.

As it can be better appreciated with reference also to FIG. 3A, each front hinge 25a, 27a comprises a pair of plates 71 rotatably supporting a corresponding section of shaft 51 of reel 45, 47, 49. Plates 71 of each pair of plates rotate about the hinge axis of the corresponding front hinge 25a, 27a. Preferably moreover, said hinge axis coincides with the hinge axis of rear hinge 25b, 27b. In FIGS. 3 and 3A plates 71 of each front hinge 25a, 27a are shown in closed configuration, i.e. in the same configuration they assume when header 11 is extended as shown in FIG. 1. More particularly, plate 71 rotatably supporting shaft 51 of reel 47, 49 of lateral header sections 15, 17 is shown disconnected from shaft 51, so as to put into evidence a connecting pin 73 transmitting the rotational movement from one section of shaft 51 to another when header 11 is in the extended configuration as shown in FIG. 1. A transmission coupling, for instance a thousand ribs joint, is provided between plates 71 of each pair of plates of the corresponding front hinge 25a, 27a in order to ensure motion transmission between the sections of shaft 51 of reel 45, 47, 49. When header 11 is in working configuration, i.e. in the configuration shown in FIG. 1, plates 71 face each other and the transmission coupling is engaged. When header 11 is partially rotated in order to move to the rest configuration, as shown in FIGS. 3, 3A, plates 71 are rotated relative to each other about the hinge axis of the corresponding hinge 25a, 27a and transmission coupling is disengaged.

As it can be better appreciated with reference also to FIG. 3B, rear hinges 25b, 27b comprise two pairs of plates 75 connecting said rear hinges 25b, 27b to the adjacent frame sections 19, 21, 23. In the preferred embodiment illustrated, rear hinges 25b, 27b comprise a double articulated joint comprising arms 77 hinged in their lower part at a first end to a corresponding plate 75 and at the opposite end to an intermediate rocker arm 79. The double articulated joint is moreover received between plates 75 and it attains the advantages which will become more apparent from the following description, with particular reference to the completely folded configuration of header 11. Rear hinges 25b, 27b support most of the weight of lateral header sections 15, 17 when header 11 is folded, and the double articulated joint described allows ensuring the necessary resistance to strains, both in static conditions and when the header is moved during transfers in folded configuration and undergoes considerable and sudden stresses due to ground variations and changes of direction. Preferably, plates 75 are L-shaped, with feet 75a of the "L" oriented in opposite directions and associated with the respective frames 19, 21, 23 when header 11 is in its working extended configuration. In this manner, always referring to such an extended configuration, legs 75b of the "L" are parallel and adjacent and, when header 11 is folded, said legs 75b are substantially mutually aligned so as to reduce the overall longitudinal size of header 11 when lateral sections 15, 17 are folded over central section 13.

Figure 4:
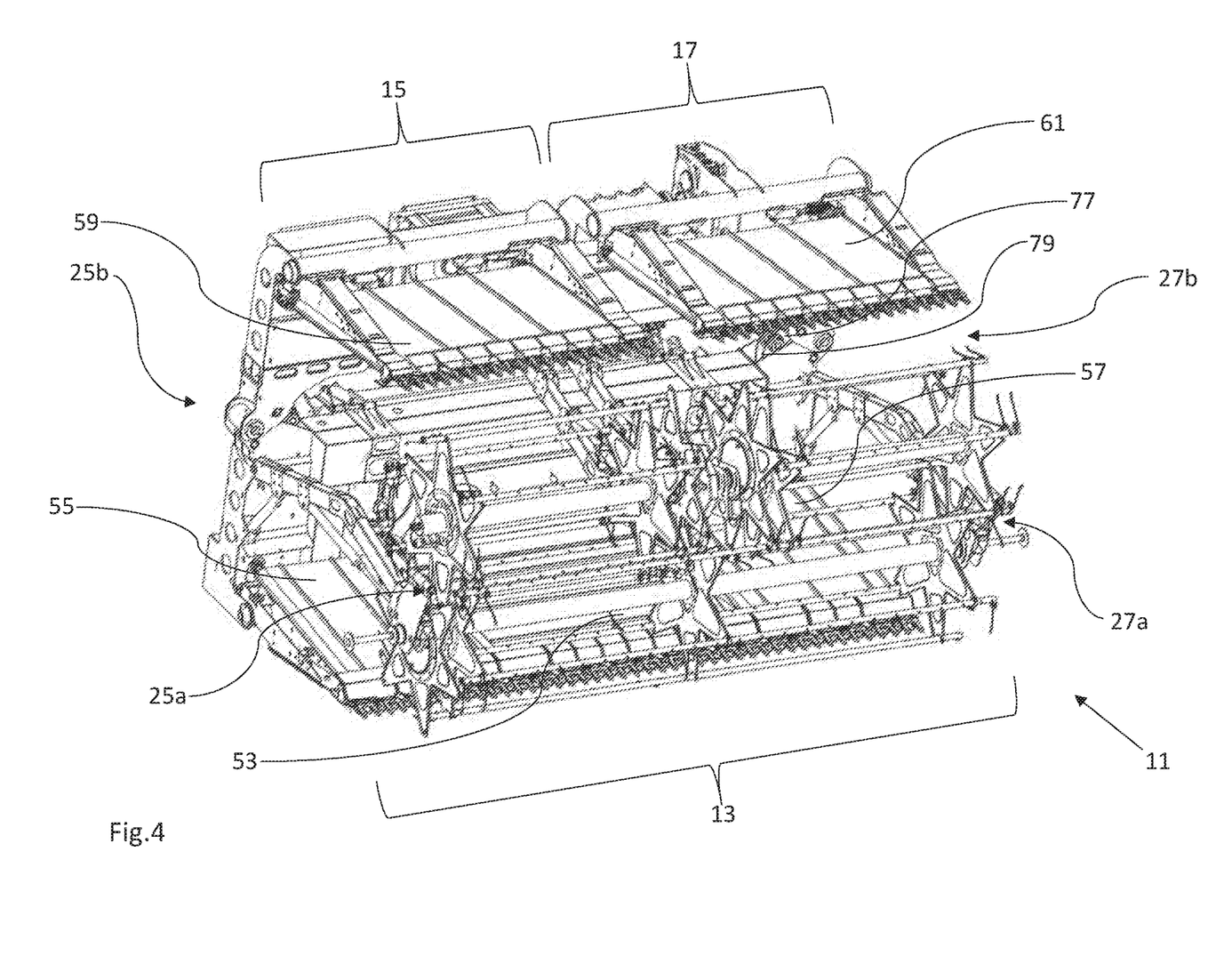
FIG. 4 is a perspective view of the header shown in FIG. 2, in completely folded rest configuration.

Referring to FIG. 4, header 11 is shown in completely folded configuration, with lateral header sections 15, 17 overlapping central header section 13. In such a configuration, front hinges 25a, 27a and rear hinges 25b, 27b are rotated by about 180° about a common axis with respect to the configuration assumed by header 11 in its operative or working extended condition. In such a folded configuration, drapers 59, 61 of lateral header sections 15, 17 are substantially coplanar and are parallel and superimposed to drapers 53, 55, 57 of central section 13. As it can be better appreciated from this Figure, when header 11 is in its completely folded configuration, arms 77 and rocker arm 79 of the double articulated joint of rear hinges 25b, 27b are received between plates 75 of the corresponding rear hinges. Such an arrangement also affords the advantage of limiting the vertical extension, i.e. the size in height, of header 11, thereby ensuring a better visibility during displacements of the combine harvester incorporating header 11.

Figure 5:
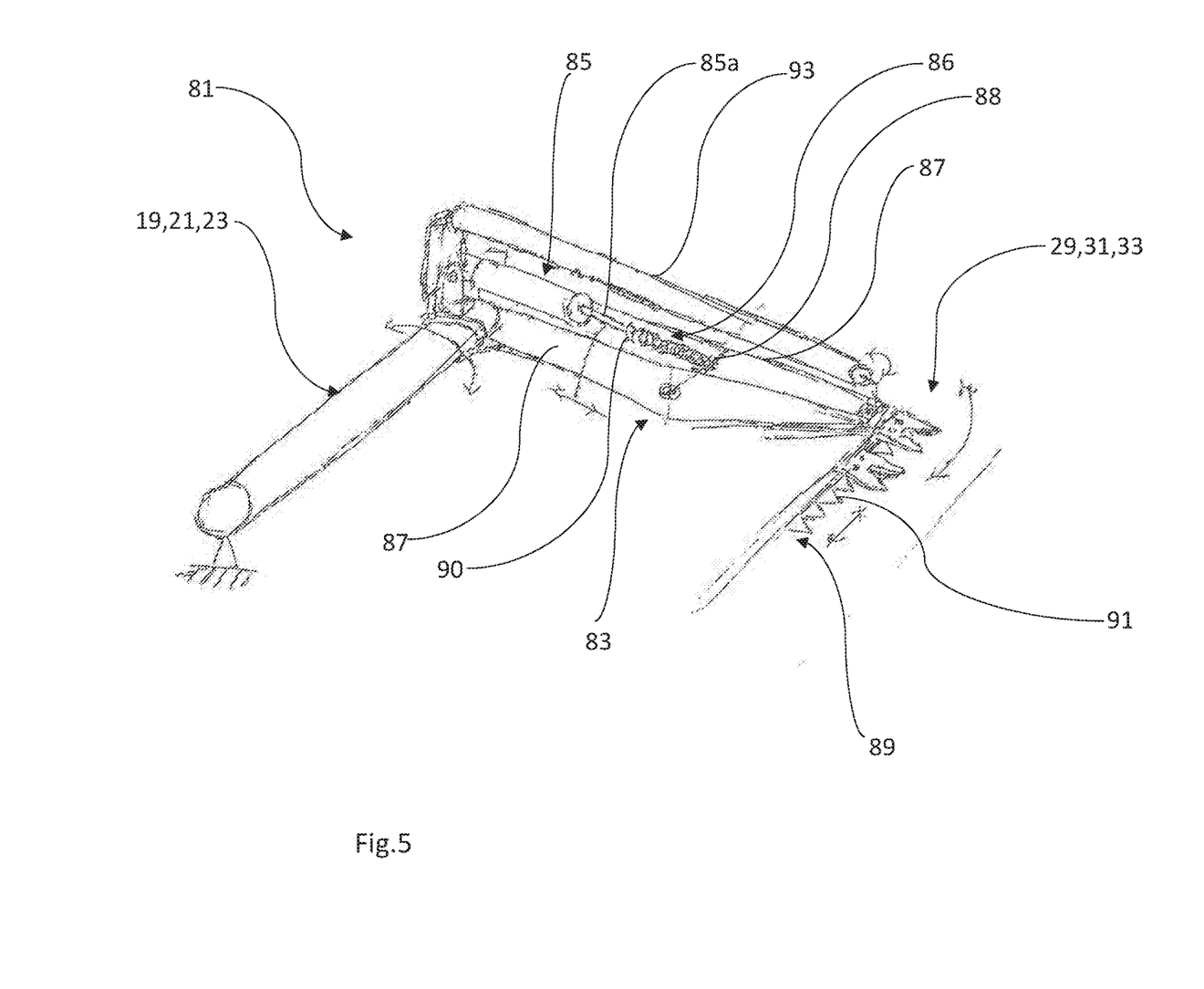
FIG. 5 is a schematic perspective view of the suspension system of the cutting bar.

Referring to FIG. 5, there is shown in detail suspension system 81 of cutting bar 29, 31, 33. Suspension system 81 comprises suspension swivel arms 83. In the preferred embodiment illustrated, swivel arms are box-shaped and are hinged at their rear end to frame 19, 21, 23 of the corresponding header section 13, 15, 17. Arms 83 support at their front end cutting bar 29, 31, 33. Moreover, arms 83 support, besides cutting bar 29, 31, 33, also transport belts 37, 39, 41 arranged behind the cutting bar and in a position higher than that of the cutting bar, when the machine is in its working configuration. Arms 83 cooperate with hydraulic cylinders 85 hinged at their rear end to frame 19, 21, 23 of the corresponding header section 13, 15, 17 in a position adjacent to the zone where arms 83 are hinged. Moreover, hydraulic cylinders 85 are hinged at their front end to arms 83, at a distance from the zone where arms 83 are hinged to frame 19, 21, 23 substantially corresponding to $\frac{2}{3}$ of the length of arms 83. Moreover, hydraulic cylinders 85 are at least partially received between parallel plates 87 defining the box-shaped structure of arms 83. Preferably, according to the invention, hydraulic cylinders 85 are connected at their front end to an extension spring 86. Extension spring 86 is arranged between the front end of stem 85a of hydraulic cylinder 85 and a pin 88 for anchoring spring 86 to the box-shaped structure of arms 83. Preferably moreover an adjusting device 90 is provided between extension spring 86 and stem 85a for tensioning spring 86, between stem 85a and anchoring pin 88.

Cutting bar 29, 31, 33 is preferably of a conventional type, comprising a blade 89 having a plurality of substantially trapezoid-shaped knives 91 and capable of carrying out a to-and-fro movement imparted by a motor-driven control member having a motion transmission shaft 93 arranged parallel to arms 83 and hydraulic cylinders 85 and capable of moving knives 91 of cutting bar 29, 31, 33.

Header 11 according to the invention can be applied to grain harvesting machines of known type, without requiring modifications, and it has industrial application both on already existing combine harvesters and on harvesters of new design.

The harvesting header as described and illustrated can undergo several changes and modifications, included in the same inventive principle.

The invention claimed is:
1. A harvesting header (11) for a grain harvesting machine (100), comprising:
a central header section (13),
a pair of lateral header sections (15, 17) hinged to opposite sides (13a, 13b) of the central header section (13) and arranged to rotate relative to the central header section (13) for assuming a working configuration, in which the central and pair of lateral header sections (13, 15, 17) are mutually horizontally aligned, and a rest or transport configuration, in which the pair of lateral header sections (15, 17) overlap the central header section (13), each of said central and pair of lateral header sections (13, 15, 17) being provided with:
- a support frame (19, 21, 23), wherein the support frame (19) of the central header section (13) is configured to be firmly associated with a grain harvesting machine (100), and wherein the support frame (21, 23) of each lateral header section (15, 17) is hinged to the support frame (19) of the central section (13),
- a substantially rectilinear motor-driven cutting bar (29, 31, 33) arranged at a front of the harvesting header (11) and associated with the support frame (19, 21, 23) by a hydraulic suspension (81), wherein the cutting bar (29, 31, 33) comprises a blade (89) having a plurality of substantially trapezoid-shaped knives (91) and capable of carrying out a to-and-fro movement by a motor-driven control member (93),
- a motor-driven pick-up reel (45, 47, 49) arranged substantially above the cutting bar (29, 31, 33) and supported on the support frame (19, 21, 23) by swivel arms (65) associated with hydraulic cylinders (69), and
- a transport belt conveyor (37, 39, 41) arranged downstream of the cutting bar (29, 31, 33) and equipped with a draper (53, 55, 57, 59, 61) rotatable on rollers (63), wherein the transport belt conveyor (39, 41) of the pair of lateral header sections (15, 17) is configured to feed the material cut by the cutting bar (29, 31, 33) towards the central header section (13), in a direction substantially perpendicular to an advance direction of the harvesting header (11) during grain cutting, wherein the transport belt conveyor (37) of the central header section (13) comprises a central belt portion (39a) and a pair of lateral belt portions (39b, 39c), the lateral belt portions (39b, 39c) being configured to feed the material coming from the transport belt conveyors (39, 41) of the pair of lateral header sections (15, 17) and from the cutting bar (29) of the central header section (13) towards the central belt portion (39a), and the central belt portion (39a) being configured to cooperate with a feeding roller (43) provided in the central header section (13) for feeding the material downstream of the harvesting header (11) towards a rear part of the harvesting header (11);

wherein said pair of lateral header sections (15, 17) hinged to the opposite sides (13a, 13b) of the central section (13) each rotate about at least one hinge (25b, 27b) arranged in a rear position between the support frames (21, 23) of corresponding header sections; and wherein the pick-up reels (45, 47, 49) are provided with corresponding hinges (25a, 27a) permanently connecting the pick-up reels (45, 47, 49) and ensuring that adjacent ones of the pick-up reels (45, 47, 49) remain secured to each other during folding movement of the pair of lateral header sections (15, 17) relative to the central header section (13) to the rest or transport configuration of the harvesting header (11).

2. The harvesting header (11) according to claim 1, wherein each of the (25a, 27a) connecting the pick-up reels comprises a pair of plates (71) rotatably supporting a corresponding section of a shaft (51) of the pick-up reels (45, 47, 49), and wherein a transmission coupling is provided between the plates of each of the pair of plates (71) of the corresponding hinge (25a, 27a) in order to ensure motion transmission between the sections of the shaft (51) of the pick-up reels (45, 47, 49).

3. The harvesting header (11) according to claim 1, wherein the at least one hinges (25b, 27b) arranged in a rear position between the support frames (21, 23) of the corresponding header sections comprise two pairs of plates (75) connecting said at least one hinges (25b, 27b) to the support frame (19) of the central header section (13) and the support frame (21, 23) of each of the pair of lateral header sections (15, 17), and wherein each of the at least one hinges (25b, 27b) comprise a double articulated joint comprising arms (77) hinged in a lower part thereof at a first end to a corresponding one of the plates (75) and at an opposite end to a rocker arm (79).

4. The harvesting header (11) according to claim 3, wherein the plates (75) of each of the at least one hinges (25b, 27b) are L-shaped plates, with feet (75a) of the L-shaped plates oriented in opposite directions and associated with a respective one of the support frames (19, 21, 23) when the pair of lateral header sections (15, 17) is in the working configuration and with legs (75b) of the L-shaped plates parallel and adjacent, and wherein said legs (75b) are substantially mutually aligned so as to reduce overall dimensions in length of the harvesting header (11) when the lateral header sections (15, 17) are folded over the central header section (13) in the rest or transport configuration.

5. A combine harvester, comprising a harvesting header (11) according to claim 1.

6. The harvesting header (11) according to claim 1, wherein said hydraulic suspension (81) comprises suspension swivel arms (83) frontally supporting the cutting bars (29, 31, 33) and the transport belt conveyors (37, 39, 41) arranged at a rear of the cutting bars and in a position higher than that of the cutting bars when the pair of lateral header sections (15, 17) is in the working configuration, and wherein the suspension swivel arms (83) cooperate with hydraulic cylinders (85) hinged at a rear end thereof to the support frame (19, 21, 23) of the corresponding central or lateral header section (13, 15, 17).

7. The harvesting header (11) according to claim 1, wherein the support frame (19) of the central header section (13) is firmly associated with a grain harvesting machine (100).

8. A harvesting header (11) for a grain harvesting machine (100), comprising:
- a central header section (13),
- a pair of lateral header sections (15, 17) hinged to opposite sides (13a, 13b) of the central header section (13) and arranged to rotate relative to the central header section (13) for assuming a working configuration, in which the central and pair of lateral header sections (13, 15, 17) are mutually horizontally aligned, and a rest or transport configuration, in which the pair of lateral header sections (15, 17) overlap the central header section (13), each of said central and pair of lateral header sections (13, 15, 17) being provided with:
- a support frame (19, 21, 23), wherein the support frame (19) of the central header section (13) is configured to be firmly associated with a grain harvesting machine (100), and wherein the support frame (21, 23) of each lateral header section (15, 17) is hinged to the support frame (19) of the central section (13),
- a substantially rectilinear motor-driven cutting bar (29, 31, 33) arranged at a front of the harvesting header (11) and associated with the support frame (19, 21, 23) by a hydraulic suspension (81), wherein the cutting bar (29, 31, 33) comprises a blade (89) having a plurality of substantially trapezoid-shaped knives (91) and capable of carrying out a to-and-fro movement by a motor-driven control member (93), a motor-driven pick-up reel (45, 47, 49) arranged substantially above the cutting bar (29, 31, 33) and supported on the support frame (19, 21, 23) by swivel arms (65) associated with hydraulic cylinders (69), and a transport belt conveyor (37, 39, 41) arranged downstream of the cutting bar (29, 31, 33) and equipped with a draper (53, 55, 57, 59, 61) rotatable on rollers (63), wherein the transport belt conveyor (39, 41) of the pair of lateral header sections (15, 17) is configured to feed the material cut by the cutting bar (29, 31, 33) towards the central header section (13), in a direction substantially perpendicular to an advance direction of the harvesting header (11) during grain cutting, wherein the transport belt conveyor (37) of the central header section (13) comprises a central belt portion (39a) and a pair of lateral belt portions (39b, 39c), the lateral belt portions (39b, 39c) being configured to feed the material coming from the transport belt conveyors (39, 41) of the pair of lateral header sections (15, 17) and from the cutting bar (29) of the central header section (13) towards the central belt portion (39a), and the central belt portion (39a) being configured to cooperate with a feeding roller (43) provided in the central header section (13) for feeding the material downstream of the harvesting header (11) towards a rear part of the harvesting header (11);

wherein the support frame (21, 23) of each of the lateral header sections (15, 17) is hinged to the support frame (19) of the central header section (13) by a pair of hinges (25, 27) and each of said pairs of hinges (25, 27) comprises a front hinge (25a, 27a) and a rear hinge (25b, 27b); and wherein each of the front hinges (25a, 27a) comprises a pair of plates (71) rotatably supporting a corresponding section of a shaft (51) of the pick-up reels (45, 47, 49), and wherein a transmission coupling is provided between the plates of each of the pair of plates (71) of the corresponding front hinge (25a, 27a) in order to ensure motion transmission between the sections of the shaft (51) of the pick-up reels (45, 47, 49).

9. A harvesting header (11) for a grain harvesting machine (100), comprising:
a central header section (13),
a pair of lateral header sections (15, 17) hinged to opposite sides (13a, 13b) of the central header section (13) and arranged to rotate relative to the central header section (13) for assuming a working configuration, in which the central and pair of lateral header sections (13, 15, 17) are mutually horizontally aligned, and a rest or transport configuration, in which the pair of lateral header sections (15, 17) overlap the central header section (13),
each of said central and pair of lateral header sections (13, 15, 17) being provided with:
a support frame (19, 21, 23), wherein the support frame (19) of the central header section (13) is configured to be firmly associated with a grain harvesting machine (100), and wherein the support frame (21, 23) of each lateral header section (15, 17) is hinged to the support frame (19) of the central section (13), a substantially rectilinear motor-driven cutting bar (29, 31, 33) arranged at a front of the harvesting header (11) and associated with the support frame (19, 21, 23) by a hydraulic suspension (81), wherein the cutting bar (29, 31, 33) comprises a blade (89) having a plurality of substantially trapezoid-shaped knives (91) and capable of carrying out a to-and-fro movement by a motor-driven control member (93), a motor-driven pick-up reel (45, 47, 49) arranged substantially above the cutting bar (29, 31, 33) and supported on the support frame (19, 21, 23) by swivel arms (65) associated with hydraulic cylinders (69), and a transport belt conveyor (37, 39, 41) arranged downstream of the cutting bar (29, 31, 33) and equipped with a draper (53, 55, 57, 59, 61) rotatable on rollers (63), wherein the transport belt conveyor (39, 41) of the pair of lateral header sections (15, 17) is configured to feed the material cut by the cutting bar (29, 31, 33) towards the central header section (13), in a direction substantially perpendicular to an advance direction of the harvesting header (11) during grain cutting, wherein the transport belt conveyor (37) of the central header section (13) comprises a central belt portion (39a) and a pair of lateral belt portions (39b, 39c), the lateral belt portions (39b, 39c) being configured to feed the material coming from the transport belt conveyors (39, 41) of the pair of lateral header sections (15, 17) and from the cutting bar (29) of the central header section (13) towards the central belt portion (39a), and the central belt portion (39a) being configured to cooperate with a feeding roller (43) provided in the central header section (13) for feeding the material downstream of the harvesting header (11) towards a rear part of the harvesting header (11);

wherein the support frame (21, 23) of each of the lateral header sections (15, 17) is hinged to the support frame (19) of the central header section (13) by a pair of hinges (25, 27) and each of said pairs of hinges (25, 27) comprises a front hinge (25a, 27a) and a rear hinge (25b, 27b);

wherein the rear hinges (25b, 27b) comprise two pairs of plates (75) connecting said rear hinges (25b, 27b) to the support frame (19) of the central header section (13) and the support frame (21, 23) of each of the pair of lateral header sections (15, 17); and wherein each of the rear hinges (25b, 27b) comprise a double articulated joint comprising arms (77) hinged in a lower part thereof at a first end to a corresponding one of the plates (75) and at an opposite end to a rocker arm (79).

10. The harvesting header (11) according to claim 9, wherein the plates (75) of each of the rear hinges (25b, 27b) are L-shaped plates, with feet (75a) of the L-shaped plates oriented in opposite directions and associated with a respective one of the support frames (19, 21, 23) when the pair of lateral header sections (15, 17) is in the working configuration and with legs (75b) of the L-shaped plates parallel and adjacent, and wherein said legs (75b) are substantially mutually aligned so as to reduce overall dimensions in length of the harvesting header (11) when the lateral header sections (15, 17) are folded over the central header section (13) in the rest or transport configuration.

11. A harvesting header (11) for a grain harvesting machine (100), comprising:
a central header section (13), a pair of lateral header sections (15, 17) hinged to opposite sides (13*a*, 13*b*) of the central header section (13) and arranged to rotate relative to the central header section (13) for assuming a working configuration, in which the central and pair of lateral header sections (13, 15, 17) are mutually horizontally aligned, and a rest or transport configuration, in which the pair of lateral header sections (15, 17) overlap the central header section (13), each of said central and pair of lateral header sections (13, 15, 17) being provided with:

a support frame (19, 21, 23), wherein the support frame (19) of the central header section (13) is configured to be firmly associated with a grain harvesting machine (100), and wherein the support frame (21, 23) of each lateral header section (15, 17) is hinged to the support frame (19) of the central section (13), a substantially rectilinear motor-driven cutting bar (29, 31, 33) arranged at a front of the harvesting header (11) and associated with the support frame (19, 21, 23) by a hydraulic suspension (81), wherein the cutting bar (29, 31, 33) comprises a blade (89) having a plurality of substantially trapezoid-shaped knives (91) and capable of carrying out a to-and-fro movement by a motor-driven control member (93), a motor-driven pick-up reel (45, 47, 49) arranged substantially above the cutting bar (29, 31, 33) and supported on the support frame (19, 21, 23) by swivel arms (65) associated with hydraulic cylinders (69), and a transport belt conveyor (37, 39, 41) arranged downstream of the cutting bar (29, 31, 33) and equipped with a draper (53, 55, 57, 59, 61) rotatable on rollers (63), wherein the transport belt conveyor (39, 41) of the pair of lateral header sections (15, 17) is configured to feed the material cut by the cutting bar (29, 31, 33) towards the central header section (13), in a direction substantially perpendicular to an advance direction of the harvesting header (11) during grain cutting, wherein the transport belt conveyor (37) of the central header section (13) comprises a central belt portion (39*a*) and a pair of lateral belt portions (39*b*, 39*c*), the lateral belt portions (39*b*, 39*c*) being configured to feed the material coming from the transport belt conveyors (39, 41) of the pair of lateral header sections (15, 17) and from the cutting bar (29) of the central header section (13) towards the central belt portion (39*a*), and the central belt portion (39*a*) being configured to cooperate with a feeding roller (43) provided in the central header section (13) for feeding the material downstream of the harvesting header (11) towards a rear part of the harvesting header (11);

wherein the pick-up reels (45, 47, 49) are provided with corresponding hinges (25*a*, 27*a*) permanently connecting the pick-up reels (45, 47, 49) and ensuring that adjacent ones of the pick-up reels (45, 47, 49) remain secured to each other during folding movement of the pair of lateral header sections (15, 17) relative to the central header section (13) to the rest or transport configuration of the harvesting header (11).

12. The harvesting header (11) according to claim 11, wherein said hydraulic suspension (81) comprises suspension swivel arms (83) frontally supporting the cutting bars (29, 31, 33) and the transport belt conveyors (37, 39, 41) arranged at a rear of the cutting bars and in a position higher than that of the cutting bars when the pair of lateral header sections (15, 17) is in the working configuration, and wherein the suspension swivel arms (83) cooperate with hydraulic cylinders (85) hinged at a rear end thereof to the support frame (19, 21, 23) of the corresponding central or lateral header section (13, 15, 17).

* * * * *